(12) United States Patent
Nguyen et al.

(10) Patent No.: US 9,870,600 B2
(45) Date of Patent: Jan. 16, 2018

(54) RAW SENSOR IMAGE AND VIDEO DE-HAZING AND ATMOSPHERIC LIGHT ANALYSIS METHODS AND SYSTEMS

(71) Applicants: The Regents of the University of California, Oakland, CA (US); Changyoung Han, Gyeonggi-do (KR)

(72) Inventors: Truong Q. Nguyen, San Diego, CA (US); Yeejin Lee, San Diego, CA (US); Changyoung Han, Gyeonggi-do (KR)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/989,439

(22) Filed: Jan. 6, 2016

(65) Prior Publication Data

US 2016/0196637 A1  Jul. 7, 2016

Related U.S. Application Data (60) Provisional application No. 62/100,166, filed on Jan. 6, 2015.

(51) Int. Cl.
| | | |
|---|---|---|
| *G06T 3/40* | (2006.01) | |
| *G06T 5/20* | (2006.01) | |
| *G06T 5/00* | (2006.01) | |
| *H04N 9/73* | (2006.01) | |
| *H04N 9/64* | (2006.01) | |

(52) U.S. Cl.
CPC .......... *G06T 3/4015* (2013.01); *G06T 5/003* (2013.01); *G06T 5/20* (2013.01); *H04N 9/646* (2013.01); *H04N 9/735* (2013.01); *G06T 2207/10024* (2013.01)

(58) Field of Classification Search
CPC ......... G06T 3/4015; G06T 2207/10024; G06T 5/001; G06T 5/20; G06T 5/003; H04N 9/735; H04N 9/646
USPC ...................................................... 348/224.1
See application file for complete search history.

(56) References Cited

U.S. PATENT DOCUMENTS

| | | | | |
|---|---|---|---|---|
| 8,559,744 | B2 * | 10/2013 | Cao ...................... | G06T 3/4015 |
| | | | | 358/3.26 |
| 9,031,345 | B2 * | 5/2015 | Jin ......................... | G06T 5/003 |
| | | | | 382/254 |
| 9,255,439 | B2 * | 2/2016 | Goossens .............. | E06B 3/5892 |
| 9,305,339 | B2 * | 4/2016 | Yang ....................... | G06K 9/40 |
| 9,330,442 | B2 * | 5/2016 | Kang ...................... | G06T 5/002 |
| 9,349,170 | B1 * | 5/2016 | Gibson ................... | G06T 5/001 |

(Continued)

OTHER PUBLICATIONS

He et al., Single Image Haze Removal Using Dark Channel Prior, Dec. 2011, IEEE Transactions on Pattern Analysis and Machine Intelligence, vol. 33, No. 12.*

(Continued)

*Primary Examiner* — Pritham Prabhakher
(74) *Attorney, Agent, or Firm* — Greer, Burns & Crain, Ltd.; Steven P. Fallon (57) ABSTRACT

A method for processing image or video data receives color filtered mosaiced raw image or video data. The method, performed in an image processing pipeline, de-hazes the color filtered mosaiced raw image or video data, e.g. Bayer image data, to create de-hazed mosaiced image or video data and de-mosaicing the de-hazed mosaiced image or video data to crate de-hazed and de-mosaiced image or video data.

22 Claims, 5 Drawing Sheets

(56) References Cited

U.S. PATENT DOCUMENTS

| | | | |
|---|---|---|---|
| 9,508,126 B2* | 11/2016 | Yang | G06T 5/10 |
| 9,508,129 B1* | 11/2016 | Wang | G06T 5/003 |
| 2005/0200733 A1* | 9/2005 | Malvar | G06T 3/4015 |
| | | | 348/272 |
| 2011/0097008 A1* | 4/2011 | Cao | G06T 3/4015 |
| | | | 382/260 |
| 2011/0317916 A1* | 12/2011 | Zhang | G06T 3/4015 |
| | | | 382/167 |
| 2013/0222655 A1* | 8/2013 | Peng | H04N 5/217 |
| | | | 348/242 |
| 2015/0334359 A1* | 11/2015 | Hayashi | G06T 5/003 |
| | | | 348/242 |
| 2016/0292824 A1* | 10/2016 | Li | G06T 5/002 |

OTHER PUBLICATIONS

Ruderman et al., Statistics of Natural Images: Scaling in the Woods, Aug. 8, 1994, Physical Review Letters, vol. 73, No. 6.*

Gibson, Kristofor, B., et al., "Fast Single Image Fog Removal Using the Adaptive Wiener Filter", 20th IEEE International Conference onImage Processing (ICIP), 2013, Sep. 15-18, 2013, pp. 714-718.

He, Kaiming, et al., "Single Image Haze Removal Using Dark Channel Prior", IEEE Transactions on Pattern Analysis and Machine Intelligence, vol. 33, No. 12, (Dec. 2011), pp. 2341-2353.

Ramanath, Rajeev, et al., "Demosaicking methods for Bayer color arrays", Journal of Electronic Imaging, vol. 11, No. 3, (Jul. 2002), pp. 306-315.

Tan, Robby, T., "Visibility in Bad Weather from a Single Image", 2008 IEEE Conference on Computer Vision and Pattern Recognition, Jun. 23-28, 2008, (8 pages).

* cited by examiner

At the pixel location p = (1,1) in Eq.(8)

(1,1) in B-plane (1,1) in G-plane (1,1) in R-plane

FIG. 4A $\Omega_p^B$ : local region in Eq.(12)

At the pixel location (1,1), there is only green.

FIG. 4B

RAW SENSOR IMAGE AND VIDEO DE-HAZING AND ATMOSPHERIC LIGHT ANALYSIS METHODS AND SYSTEMS

PRIORITY CLAIM AND REFERENCE TO RELATED APPLICATION

This application claims priority under 35 U.S.C. §119 from prior provisional application Ser. No. 62/100,166, which was filed on Jan. 6, 2015.

FIELD

A field of the invention is image and video processing. An example application of the invention is to digital cameras. Another example application of the invention is to computer vision systems. Particular applications of the invention include many systems that process or analyze image and video data, including, for example, consumer and professional level digital cameras, advanced driver assistant systems (ADAS), intelligent surveillance systems, security systems, traffic monitoring systems, vehicle guidance and self-driving systems.

BACKGROUND

Digital imaging systems, including cameras that obtain still and video data, include an image sensor and a color filter. The image sensor itself is capable of sensing intensity of radiation at each pixel of the sensor, which ranges into tens of millions of pixels for modern cameras. Color channels must be created to determine colors sensed. This is the role of the color filter. The color filter is patterned to provide three separate color channels, e.g., red (R), green (G), and Blue (B) channels. Each pixel of the image sensor is filtered by the color filter to receive only one of the three colors. Accordingly, each pixel does not physically record the full color spectrum incident upon that pixel. The digital imaging system therefore includes a processing pipeline to process data from the image sensor. A critical initial function of the processing pipeline as used in known imaging systems ranging from inexpensive digital cameras to the highest level professional model SLR and mirrorless cameras is recovering the fully color spectrum at each pixel of the image sensor. This process is known as de-mosaicing, and is conducted as a first stage of imaging processing.

The de-mosaicing obtains a full-color image, including a set of complete red, green, and blue values for each pixel. Note that the memory (comparing to the original raw sensor image size), as well as implementation complexity, is increased by a factor of 3 (three times the number of pixels to process). This de-mosaicing process is required to render raw images into a viewable format.

A widely used color filter is known as a Bayer filter. The de-mosaicing process when the Bayer filter is employed is sometimes referred to as debayering. The process is complex but also must be conducted at high speed. Modern imaging systems are capable of processing many images per second. Rendering of these images, such as via viewfinder requires de-mosaicing. Different camera manufacturers and image processing software systems employ different techniques for de-mosaicing. All are designed to permit rendering of a full image in real time or close to real time.

Imaging systems also include noise removal. An important noise source is haze, and many systems include de-hazing in an image pipeline. The haze in images and videos can impede greatly the clarity of the images. This inhibits the appearance of the images to a human observer, and provides images with less than desirable clarity.

Haze can also interfere with intelligent use of an acquired image by electronic systems that benefit from image clarity. State of the art image systems analyze full color images. State of the art approaches for single image de-hazing are disclosed in K. He, J. Sun, and X. Tang, "Single image haze removal using dark channel prior," IEEE Trans. on Pattern Analysis and Machine Intelligence, vol. 33, no. 12, pp. 2341-2353, December 2011; He, Sun, & Tang, "Single Image Haze Removal Using Dark Channel Prior," Proc IEE Conf. Comput. Vist Pattern Recognit. (CVPR), pp. 1956-63 (2009); K. B. Gibson and T. Q. Nguyen, "Fast single image fog removal using the adaptive wiener filter," in Proceedings of Int. Conf. on Image Processing, 2013, pp. 714-718.

Known image processing engines have focused on the recovery of the full color data as an initial critical step. The de-mosaicing is viewed in the art as a critical step for generation of color images from raw sensor data. De-hazing, transforms, and other forms of image correction are conducted after de-mosaicing. Normally, the only processing conducted prior to de-mosaicing includes color scaling and black level adjustment. From an image sensor, a conventional camera pipeline conducts an analog to digital conversion from the sensor that creates a set of raw sensor data. Linear color scaling and black level adjustment are then conducted. De-mosaicing follows and then de-hazing and other corrections, such as nonlinear corrections are applied.

De-hazing is a post-processing (de-mosaicing) step to enhance visibility in a conventional digital camera processing pipeline. In presence of haze or fog, the radiance $x_p \in \mathbb{R}^3$ from an object is attenuated by atmospheric scattering corresponding to distance from the camera to the object, at a spatial location p. When the scattered light $a \in \mathbb{R}^3$ along an atmospheric path combines with the attenuated object radiance, the captured scene radiance $\mathcal{Y}_p \in \mathbb{R}^3$ is degraded as $$\mathcal{Y}_p = t_p x_p + (1-t_p)a$$

In the above expression, $t_p \in \mathbb{R}$ is transmission, which is exponentially decayed with distance and invariant to wavelengths. The degraded visibility is classically improved by statistically estimating scene distance in the above expression and by adjusting scene radiance according to the scene distance. See, e.g., Philippe & Hautiere, "Fast Visibility Restoration from a Single Color or Gray Level Image," IEEE Int. Conf. Comput. Vis (ICCV), pp. 2201-2208 (2009); Gibson & Nguyen, "Fast Single Image Fog Removal Using the Adaptive Wiener Filter," Proc. IEEE Int. Conf. Image Processing (ICIP), pp. 714-728 (2013); He, Sun, & Tang, "Single Image Haze Removal Using Dark Channel Prior," Proc IEE Conf. Comput. Vist Pattern Recognit. (CVPR), pp. 1956-63 (2009). These approaches measure statistics of images (such as dark channels) in a single foggy image.

SUMMARY OF THE INVENTION

The present inventors have determined that many benefits can be achieved in terms of processing speed and/or memory demands by fundamentally altering the conventional pipeline. The inventors have determined that de-hazing can be conducted on mosaiced data, prior to the de-mosaicing process. Preferred embodiments can reduce memory resources as well as implementation complexity by a factor of 3 compared to state of the art systems. Embodiments of the invention include methods for image processing and image processing pipelines that de-haze images and/or videos using raw sensor data. The mosaic is later removed (de-mosaicing) to render a viewable raw image after de-hazing conducted on a raw color filter array. Embodiments of the invention are independent of the type of de-mosaicing that can be used. Preferred de-hazing techniques provide a mosaiced image space that can be processed by any de-mosaicing process that was designed for the raw data prior to de-hazing of the raw mosaiced data in accordance with the invention.

DETAILED DESCRIPTION OF THE PREFERRED EMBODIMENTS

Preferred methods and pipelines of the invention provide for de-hazing of a mosaiced image. Methods and pipelines of the invention can be implemented, for example, in camera systems and video systems. Methods and pipelines of the invention can also be implemented in image processing software and systems. Preferred embodiments will be discussed with respect to raw data from an image sensor filtered with a Bayer array, but artisans will appreciate that the invention is applicable to sensor data obtained from other types of color filter arrays (CFA).

The invention is applied to image processing pipelines that have a physical image sensor with a color filter array to sense an image and subsequent processing to render a viewable image, such as on a display, or to provide full color image data to an image analysis system for processing, such as a security or automated recognition system.

Preferred methods in software of the invention are included in systems that have image acquisition, analysis and/or display for human or system usage. Preferred methods in software of the invention are included in machine vision systems that provide information to control the guidance of a tool, a vehicle, a laser or other physical device.

Those knowledgeable in the art will appreciate that particular processes in preferred embodiments of the present invention lend themselves well to practice in the form of computer program products. Accordingly, it will be appreciated that embodiments of the present invention may comprise computer program products comprising computer executable instructions stored on a non-transitory computer readable medium that, when executed, cause a computer to undertake methods according to the present invention, or a computer configured to carry out such methods. The executable instructions may comprise computer program language instructions that have been compiled into a machine-readable format. The non-transitory computer-readable medium may comprise, by way of example, a magnetic, optical, signal-based, and/or circuitry medium useful for storing data. The instructions may be downloaded entirely or in part from a networked computer. Also, it will be appreciated that the term "computer" as used herein is intended to broadly refer to any machine capable of reading and executing recorded instructions. It will also be understood that results of methods of the present invention may be displayed on one or more monitors or displays (e.g., as text, graphics, charts, code, etc.), printed on suitable media, stored in appropriate memory or storage, etc.

Preferred embodiments provide a method and image processing pipeline that analyzes and estimates atmospheric light. Traditional methods introduce long execution times and require large memory resources to sort all pixels in an image. In the preferred embodiment, atmospheric light is estimated in subsampled version of images based on the following considerations determined by the inventors to effectively reduce hardware burden while providing a useful estimate of atmospheric light: 1) Atmospheric light varies smoothly in local neighborhood regions and the pixel values are similar to each other in the local neighborhood regions; 2) edges and details need not be preserved while estimating atmospheric light as the preferred embodiment treats atmospheric light as invariant in an entire image.

Preferred embodiments provide a method and image processing pipeline with de-hazing process followed by de-mosaicing. Test results show excellent results. Preferred embodiments de-haze images obtained from raw sensor data in the form of a color filter array, such as image data obtained from Bayer filter sensors. According to the characteristic of images as piecewise constant, missing pixels in Bayer images can be replaced by their nearest neighbors. Based on the observations of the inventors, de-hazing is conducted directly in Bayer images without reconstructing full color images. The preferred methods are believed to be unique in de-hazing in Bayer images. Testing has shown that preferred embodiments: 1) reduce memory resources as well as implementation complexity by a factor of 3 (comparing to conventional approach of de-hazing in the RGB domain); 2) Reduce computational complexity and memory resources by at least three times (or more) in estimating atmospheric light; 3) Can supplement existing and yet to be created de-hazing methods, which benefit from the de-haze in the Bayer image provided by preferred embodiments.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Figure 1A:
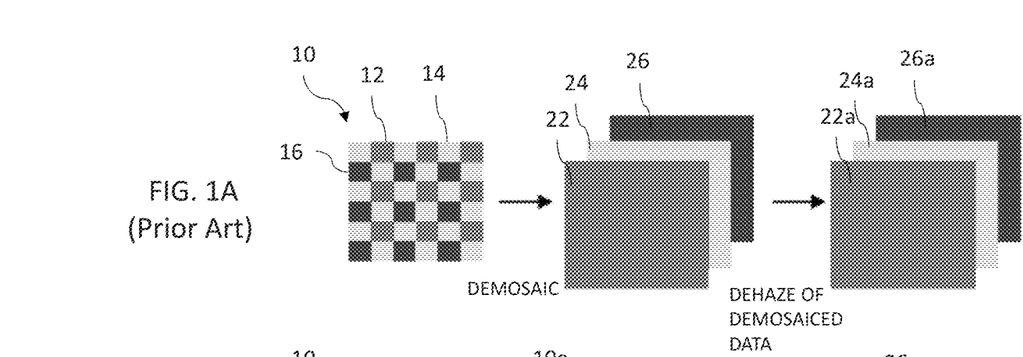
FIG. 1A (prior art) and FIG. 1B compare a conventional image pipeline (FIG. 1A) to a pipeline in accordance with the present invention.

FIG. 1A illustrates a conventional pipeline. The pipeline in FIG. 1A can include other processes, but is configured to conduct de-hazing of de-mosaiced data. In FIG. 1A, raw mosaiced data 10 includes pixels of red 12, green 14 and blue 16. The raw sensor data 10 and pixels represent a physical image sensor that is filtered with a color filter array. The example CFA pattern is that of a Bayer array, which includes twice as many green 14 pixels as red 12 and blue 16 pixels. A de-mosaicing process is conduced to produce separate red 22, green 24, and blue 26 color channels. A de-hazing process is conducted on this data set to produce the de-hazed and de-mosaiced color red 22a, green 24a, and blue 26a channels.

Figure 1B:
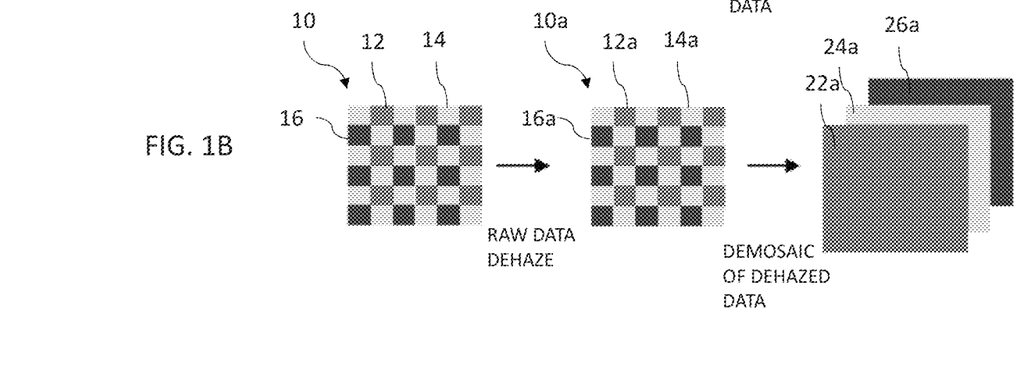

FIG. 1B illustrates an embodiment of the invention, in the form of an image processing pipeline that de-hazes images and/or videos using raw sensor data in contrast to the pipeline in FIG. 1A. A physical sensor to produce raw data 10 and CFA with red 12, green, 14 and blue pixels are the same as in FIG. 1B. The initial step of de-mosaicing is delayed, however. Instead, raw data is de-hazed to produce a modified set 10a of color filtered pixel data with de-hazed pixels of red 12a, green 14a, and blue 16a. Advantageously, this process reduces memory load and processing demands compared to the prior art processes. In FIG. 1A, the color channels 22, 24 and 26 can be considered to be triple the memory resources required compared to the non de-mosaiced, but de-hazed pixels in the modified data set 10A of FIG. 1B. Also, de-hazing is then conducted on a single data set to produce the de-mosaiced and de-hazed channels 22a, 24a, 26a in FIG. 1B. This is contrary to the accepted practice in the art which first seeks to de-haze already de-mosaiced data. This is widely viewed as a critical first step in the art, and artisans have focused on other ways to improve the processing pipeline.

The raw data de-haze in FIG. 1B to produce the modified data set 10a is accomplished in preferred embodiments by kernel based processing and in other embodiments with pixel based processing. The preferred approaches provide efficient de-hazing, and have been simulated in experiments.

A kernel based de-haze is discussed first. The approach is discussed with respect to dark channel prior de-hazing method that has been applied to single images after the images have been reconstructed as full color images, but not upon raw sensor CFA data as in the FIG. 1B pipeline. The dark channel prior method is disclosed by K. He, J. Sun, and X. Tang, "Single image haze removal using dark channel prior," IEEE Trans. on Pattern Analysis and Machine Intelligence, vol. 33, no. 12, pp. 2341-2353, December 2011; He, Sun, & Tang, "Single Image Haze Removal Using Dark Channel Prior," Proc IEE Conf. Comput. Vist Pattern Recognit. (CVPR), pp. 1956-63 (2009). As in most of existing dehazing algorithms, the dark channel prior method is designed based upon the assumption that RGB values are known for each pixel. The preferred embodiments of the invention account for the fact that with raw sensor data, only one value is known and modify the dehaze approach.

In the dark channel prior method, statistics of haze-free outdoor images called the Dark Channel Prior (DCP) are used to estimate transmission, Physically, transmission represents the portion of light (reflected by an object) actually reaching a sensor without scattering by particles in the air. It is the physical characteristic of the environment captured by the image sensor, which implicitly implies the amount of haze. Pixels in haze (bright) have high intensity values, and natural pixels without haze usually have low intensity values for at least one of the RGB channels (Dark channel assumption). If we observe the values of RGB channels, then, we can measure the relative amount of haze. In order to estimate the transmission, He et al. use the statistics of haze-free outdoor images called the Dark Channel Prior (DCP), $$d_p = \min_{p \in \Omega_p} \left( \min_{c \in \{r,g,b\}} x_p(c) \right) \tag{1}$$

where $x_p(c)$ is the $c^{th}$ color component of a pixel located at p in a haze-free image and $\Omega_p$ is a local region centered at p.

Normally, the dark channel prior method is applied to full color channels. In the present invention, it is applied to a color filtered raw image, such as a Bayer image. Preferred embodiments of the invention leverage a characteristic recognized to the inventors to treat the raw sensor/mosaiced images as piecewise constant. The piecewise constant assumption permits measurement of transmission and implementation of dehazing algorithms to CFA images. The distributions of dark channels generated by outdoor Bayer images have been determined by the inventors to be similar with the distributions of a full resolution images.

The transmission $t_d$ using DCP is defined as $$t_d = 1 - \gamma \min_{p \in \Omega_p} \left( \min_{c \in \{r,g,b\}} \frac{y_p(c)}{a(c)} \right) \tag{2}$$

where y is the intensity of a hazy image. The $c^{th}$ color component of atmospheric light is a(c) and γ is the weighting coefficient to control naturalness of de-hazed images. The variable p denotes a spatial location (coordinate) of a pixel, and Ω is a local spatial region of an image. The weighting coefficient is a pre-defined variable, typically set to 0.95. It controls the natural appearance of the dehazed images.

Figure 2A:
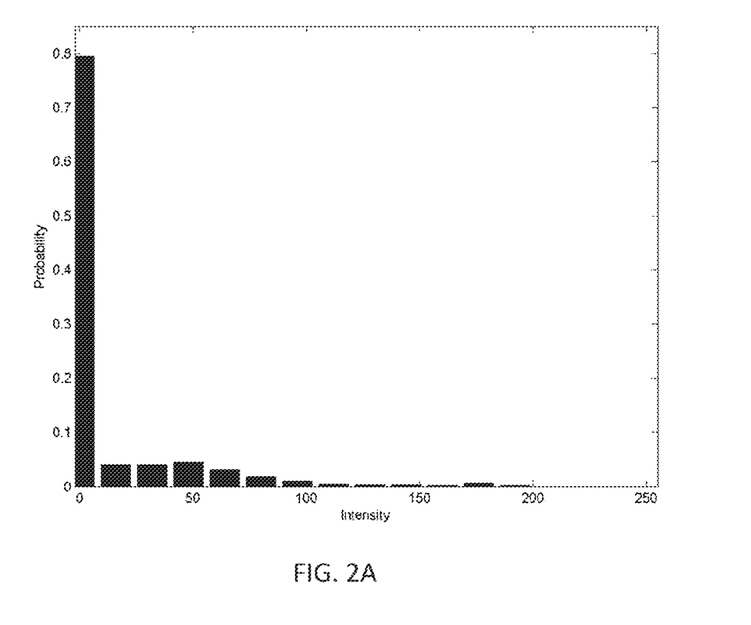
FIGS. 2A and 2B are histograms that respectively compare the dark channel of a full color image of an outdoor river and building scene with the dark channel of the Bayer image of the same scene.
Figure 2B:
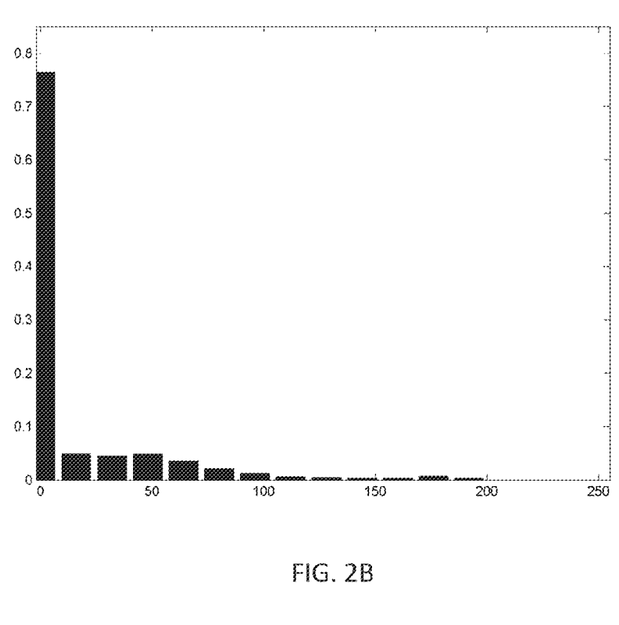
Figure 2C:
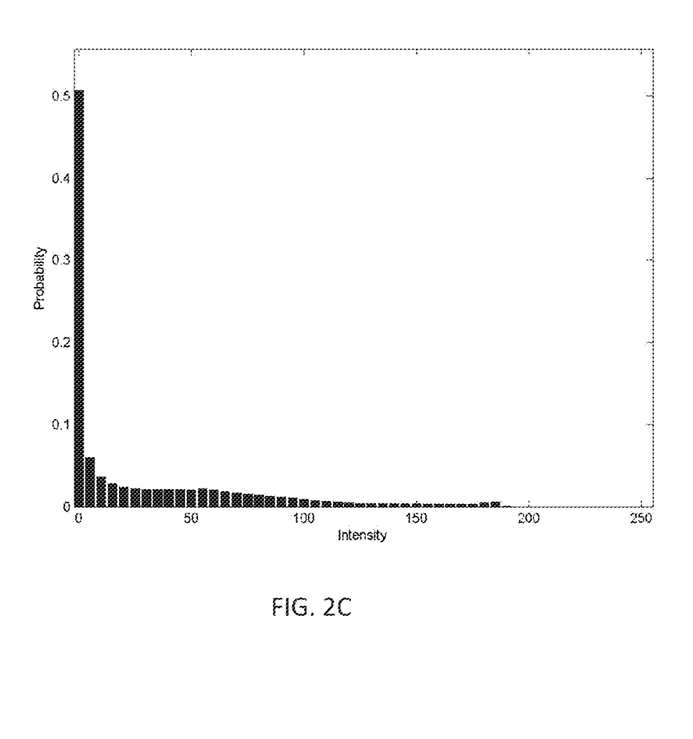
FIGS. 2C and 2D are histograms that respectively compare to minimum value among RGB channels at a pixel location (subsequently referred to as "minimum channels") of the full color image and the Bayer image.
Figure 2D:
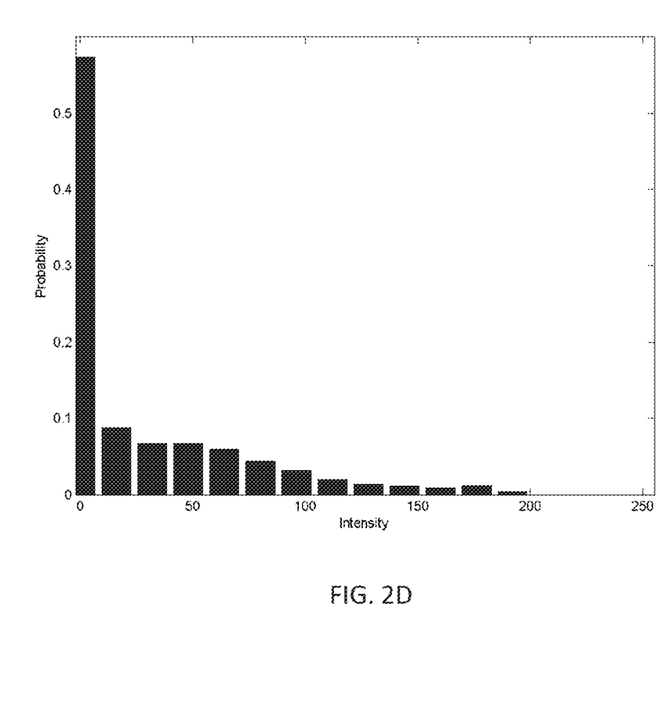
Figure 3A:
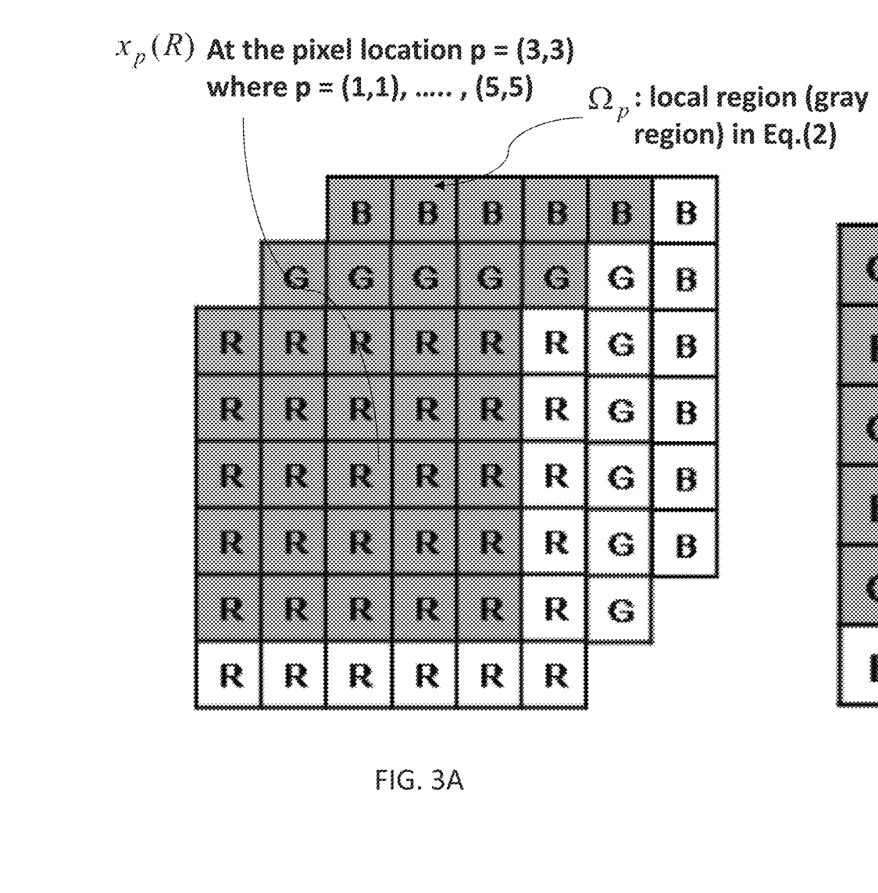
FIGS. 3A and 3B respectively illustrate measurement of dark channels in a full color image and a Bayer image.
Figure 3B:
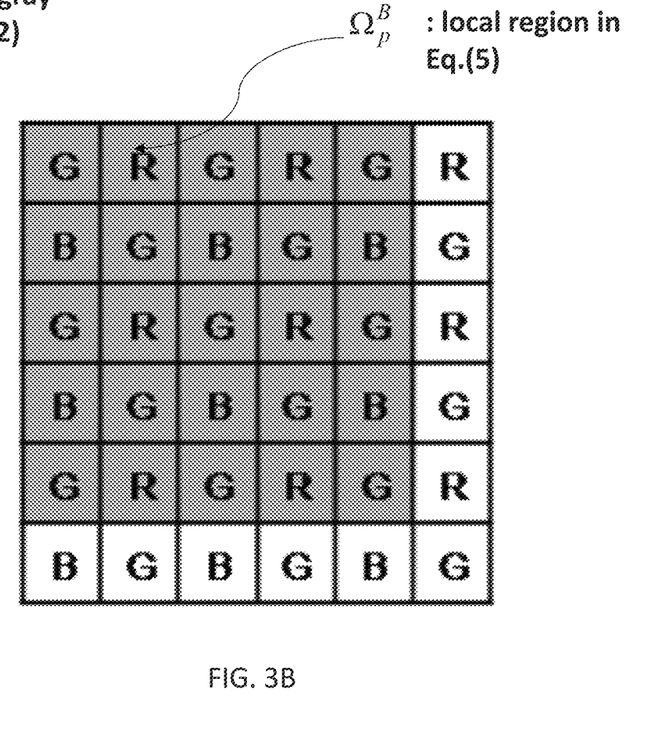

The inventors have determined that the characteristic of images as piecewise constant, missing pixels in Bayer images can be replaced by their nearest neighbors. The inventors have studied and compared distributions of dark channels generated by outdoor Bayer images to those of full channel images and determined that the distributions are similar. FIGS. 2A and 2B are histograms that respectively compare the dark channel of a full color image of an outdoor river and building scene with the dark channel of the Bayer image of the same scene. FIGS. 2C and 2D are histograms that respectively compare minimum channels of the full color image and the Bayer image. The data confirm the observation of similar distributions for an outdoor scene. With this observation, DCP $d_p^B$ (dark channels) in Bayer images can be approximately measured as $$d_p^B = \min_{p \in \Omega_p^B} x_p^B \tag{3}$$

and $$x_p^B = \Sigma_{c \in \{r,g,b\}} x_p^S(c) \tag{4}$$

where $x_p^S$ is the raw image sampled by the image sensor according to the Bayer pattern. With reference to Eqs. 2-4, $y_p^B$ is a hazy image in a CFA pattern. p is a pixel location. Where p is, for example a green pixel location, then $y_p^S$(r)=$y_p^S$(b)=0, $y_p^S$(g)=some value. Since the green color plane has values only in the green location, red and blue values are zero. Adding the three color planes provides a resultant plane that is a CFA pattern image. FIGS. 3A and 3B illustrate how to measure dark channels in RGB images and Bayer images. The example is a kernel based method. The dark channel of the region in FIG. 3A is measured as the minimum value in the gray region. The dark channel in a CFA image (FIG. 3B) can be measured within the same spatial region with RGB images. The figures are labelled with variables from equations 2 and 5. In general, the minimum value of Eq. (5) is measured in the shaded region depicted in FIG. 3B. The transmission $t_d^B$ using newly defined DCP in Bayer images is computed as $$t_d^B = 1 - \gamma \min_{p \in \Omega_p^B} \frac{y_p^B}{a^B} \tag{5}$$

where $y_p^B$ is divided by the corresponding atmospheric light is individually estimated from each channel. Eq. (5) computes transmission of the CFA image by subtracting the weighted minimum value from 1. The minimum value is measured in the local region of the hazy image $y_p^B$ normalized by the atmospheric light $a^B$. The weight is denoted as γ and is a pre-defined constant, typically chosen to 0.95.

The distribution data of FIGS. 2A-2D support that any existing patch based de-hazing algorithms can be used in accordance with the invention to de-haze a raw color filter image (mosaiced image), such as a Bayer image. The patch based algorithms can estimate transmission and atmospheric light.

One preferred approach is disclosed in K. B. Gibson and T. Q. Nguyen, "Fast single image fog removal using the adaptive wiener filter," in Proceedings of Int. Conf. on Image Processing, 2013, pp. 714-718. This is a fast de-hazing algorithm suited for real-time applications. In the method, the desired veiling v at a pixel location p is estimated from the given observation model $$o_p = v_p + n_p \quad (6)$$

where $o_p$ is the observed veiling and $n_p$ is additive noise. The veiling is measured with $$v = o_p a \quad (7)$$

and $$o_p = \min_{c \in \{r,g,b\}} y_p(c) \quad (8)$$

Given equation (6), the locally adaptive Wiener filter within each sample window $\Omega_p$ that estimates the atmospheric veiling is $$\hat{v}_p = \mu_{v,p} + \frac{\sigma_{o,p}^2 - \sigma_n^2}{\sigma_{o,p}^2}(\sigma_p - \mu_{v,p}) \quad (9)$$

The local mean $\mu_{v,p}$ and varianace $\sigma_{v,p}$ are estimated by $$\tilde{\mu}_{v,p} = \frac{1}{|\Omega_p|} \Sigma_{i \in \Omega_p} o_i \quad (10)$$

$$\tilde{\sigma}_{v,p}^2 = \frac{1}{|\Omega_p|} \Sigma_{i \in \Omega_p} (o_i - \tilde{\mu}_{v,p})^2. \quad (11)$$

Figure 4A:
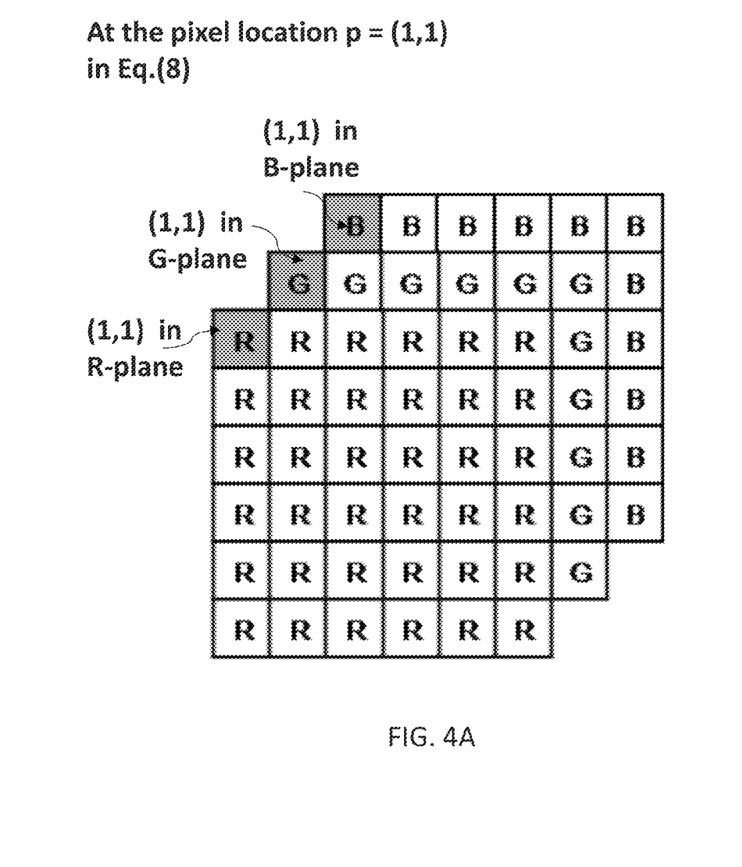
FIG. 4A shows measurement of minimum channels for each pixel in a full color image, while an example of a local region for a pixel p is shown in FIG. 4B.
Figure 4B:
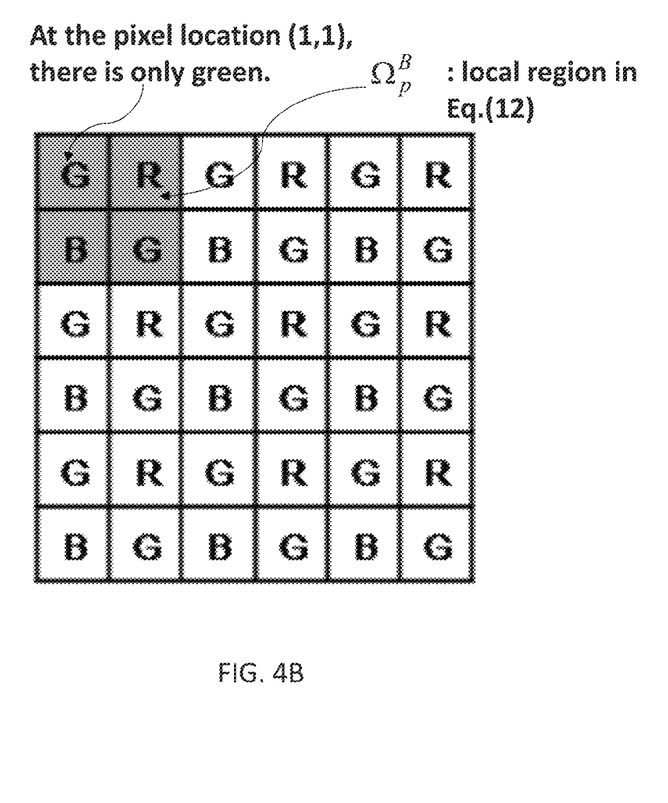

Equation (9) provides the least-square solution of transmission estimate, equation (10) provides the local mean, and equation (11) the local variance. Since pixels of the same color tend to be contiguous, the minimum intensity $o_p^B$ among RGB channels in Bayer images can be measured using adjacent pixels in accordance with the present invention as a modification of the adaptive Weiner filter process of K. B. Gibson and T. Q. Nguyen, "Fast single image fog removal using the adaptive wiener filter," in Proceedings of Int. Conf. on Image Processing, 2013, pp. 714-718:

$$o_p^B = \min_{p \in \Omega_p^B} y_p^B \quad (12)$$

where $\Omega_p^B$ is a local region of 4 pixels connected to upper left pixel located at p. Eq. (12) and FIG. 4B represent the originally applied minimum operation to same pixel location for all color channels in FIG. 4A. In the CFA pattern, the present methods find substitute values (e.g. red and blue values at the location where green value is known) because only one color channel value is known. FIG. 4A shows measurement of minimum channels for each pixel in a full color image, while an example of a region for a pixel p is shown in FIG. 4B. The refined veiling is given as Eq. (9) with Eq (10) and (11) substituting $o_p$ for $o_p^B$. FIGS. 3A-B and FIGS. 4A-4B show minimum values in the shaded regions, and use of the minimum values in Eq. (2), (5), (8), and (12) to compute transmission. The minimum value of Eq. (12) is measured in the region of FIG. 4B. The measured minimum value is then used in Eq. (9) to Eq. (11) to computer transmission of via the Wiener filter approach. The minimum channel histograms in FIGS. 2C and 2D demonstrate that estimates of missing pixels can be applied to the Bayer images themselves.

Suppose an image of m-pixel in a color plane is filtered with a n×n kernel, where m>>n. Measuring the dark channels in RGB images requires $3k^2-1$ comparison operations for each pixel, and estimating de-hazed value of a pixel requires a subtraction, an addition, and a division operation for each color channel. The typical image processing pipeline in FIG. 1A leads to $n(3k^2-1)$ comparison operations and 3n subtraction, addition, and division operation in an image of size n dark channels of Bayer images in FIG. 1 (b) is measured with $n(k^2-1)$ comparison operations and n subtraction, addition, and division operations.

Minimum channels are measured using 2n comparison operations in RGB images and 3n comparison operations in Bayer images. However, computing haze-free images takes 3n arithmetic operations in RGB images and n operations in Bayer images.

The de-hazing of CFA images in accordance with the above description was provided with the example of Bayer images. Preferred methods of the invention can be stated more generally, with respect to CFA images.

The inventors have recognized that the locally piece-wise constant image model (See, e.g., Ruderman & Bialek, "Statistics of Natural Images: Scaling in the Woods," Neural Info. Process. Sys., pp. 551-558 (1993)) permits a new color channel region to be defined as a 2×2 block (connected 4-pixel to upper left location) of a CFA pattern so that each of a R, G and B color value can be measured. Likewise, dark channels $d_p^B$ in a CFA image can be measured within the same spatial region $\Omega_p^B$ of a RGB image $$d_p^B = \min_{p \in \Omega_p^B} x_p^B \quad (13)$$

$$x_p^B = \Sigma_{c \in \{r,g,b\}} x_p^s(c)$$

where $x_p^S$ is the raw image sampled by the sensor according to the CFA pattern. Similarly, any statistical values are measures in the same local regions of a RGB image. As in Equation (2), the transmission $t_d^B$ using the preceding expressions (13) in the CFA image can be computed as $$t_d^B = 1 - \gamma \min_{p \in \Omega_p^B} \frac{y_p^B}{a^B} \quad (14)$$

where $y_p^B$ is divided by the corresponding atmospheric light color $a^B$ measured in the CFA pattern. The c-th color of atmospheric light is individually estimated from the most haze-opaque regions using bright channels or dark channels. The weighting coefficient controls the natural appearance of the de-hazed images.

Artisans will recognize many advantages of the FIG. 1B pipeline, and general advantages of methods of the invention. Some particular advantages of the invention will be discussed.

An advantage concerns de-mosaicing Effects: Raw sensor data typically are provided in the form of a CFA pattern. Since each pixel is filtered to record only one of color channels, the data from each pixel cannot fully specify each of three channel values. In order to obtain a full color image, a de-mosaicing method is applied to the raw data and it interpolates a set of complete color values for each pixel. This de-mosaicing process is required to render raw images into a viewable format.

In the presence of haze, the degraded scene radiance $z \in \mathbb{R}$ captured by an image sensor at a pixel location p is represented as $$z_p = \Lambda^T(t_p x_p + (1-t_p)a) \quad (15)$$

where $\Lambda$ is a sampling lattice, for example, $\Lambda = [1\ 0\ 0]^T$ for a red pixel. The subsampled raw sensor data are interpolated into a set of complete color values $\tilde{y}_p \in \mathbb{R}^3$ through the de-mosaicing process $$\tilde{y}_p = \Gamma z_p \approx t_p x_p + (1-t_p)a + \epsilon_p \quad (16)$$

where $\Gamma \in \mathbb{R}^3$ represents the de-mosaicing operation. De-mosaicing errors occur at edge regions and atmospheric light varies smoothly (i.e. $\Gamma \Lambda^T a \approx a$); then the estimation error in (16) approximates to $\epsilon_p = t_p (\Gamma \Lambda^T - I)x_p$. This de-mosaicing error can be amplified in the recovered process, as shown below:

$$\tilde{x}_p = \frac{y_p - (1-t_p)a}{t_p} + \frac{\epsilon_p}{t_p} = x_p + \frac{\epsilon_p}{t_p} \quad (17)$$

where $t_p \in (0,1]$ and $\epsilon_p \leq \epsilon_p/t_p$. The conventional de-hazing of a de-mosaiced image therefore can increase errors introduced by the de-mosaicing process. Such amplification of errors is avoided in the present invention.

Advantages with respect to computational complexity have been mentioned above, but can also be discussed with respect to the number of processor operations to identify specific advantages. If an image has m pixels in a color channel and there are 3 color channels, then the subsampled CFA image has m pixels. Assuming that the color image is filtered with a kernel of size n×n, measuring dark channels requires $3n^2-1$ floating-point operations (FLOPS) for each pixel, where m>>n. If the defogged image is directly recovered using the estimated dark channels without any refinement steps, 11mFLOPs are needed to calculate the transmission and corresponding fog-free image. Thus, in total, $3m(n^2+3)+mFLOPs$ are needed to compute the recovered image with an additional sorting process for measuring atmospheric light. In general, measuring atmospheric light requires at least $\mathcal{O}$ (m log m) time complexity in the average or worst case when using comparison based sorting algorithms. See, Thompson, C. D.: 'The VLSI Complexity of Sorting', IEEE Trans. Comput., 3, pp. 1171-1184 (1983). It also requires auxiliary storage $\mathcal{O}$ (m log m) to perform the sorting step in the worst case as well as the memory to store the data itself. In the CFA image, transmission estimation is carried out with $n^2+1$ FLOPs for each pixel. Then the recovered image is obtained $m(n^2+3)+m$ FLOPs. Minimum values of three color channels are measured with 2m FLOPs in the RGB image and 3m FLOPs in the CFA image. However, computing the fog-free image takes 9mFLOPs in the RGB image and 3mFLOPs with the present invention.

The analysis confirms that the implementation cost in the pipeline of FIG. 1B is approximately decreased by a factor of 3 which compared with that of RGB images due to reduced memory requirements and number of operations. When image diagonal lengths extend to five, six, seven or more thousand pixels, the computational savings is significant. Furthermore, the computational complexity of the sorting step is drastically reduced if atmospheric light is measured in downsampled versions of images without loss on the visual quality, since atmospheric light varies smoothly in an entire image.

Simulation Results

To verify the similarity of distributions of RGB images and Bayer images, various outdoor images were used. Bayer images were created from RGB images using the GRGB pattern. The dark channels for both RGB images and Bayer images were computed. The data in FIGS. 2A-2D are examples of intensity histograms for dark channels and minimum channels of RGB images and Bayer images.

Examples of de-hazed images using the adaptive Wiener filter approach of preferred embodiments were compared for the prior art and present methods. For both image pipelines of FIGS. 1A and 1B, RGB images were reconstructed from Bayer images using an adaptive color plane interpolation algorithm to maintain edge details and reduce hue transitions. See, R. Ramanath, W. E. Snyder, and G. L. Bilbro, "Demo-saicking methods for bayer color arrays," Journal of Elec-tronic Imaging, vol. 11, no. 3, pp. 306-315, July 2002. The images from both pipelines were comparable in clarity/haze removal. The examples showed that the FIG. 1B pipeline can be used instead of the typical FIG. 1A pipeline with less computational complexity and minimal impact on image quality.

Atmospheric light is the perceived intensity at a point infinitely far away toward the horizon. Atmospheric light is typically estimated from the most haze-opaque regions using bright channels or dark channels. The dark channel method includes a step of sorting entire pixels to select proper regions, which introduces long execution time and requires large memory resources in hardware implementations with a pipeline of FIG. 1A. This computational complexity is dependent on the sorting algorithm. In general, measuring atmospheric light requires at least O(m log(m)) time complexity in the average or worst case when using comparison based sorting algorithms. In Bayer images, only one color value is known for each pixel and additional operations are necessary to estimate the other two color values. The comparison in shown in Table 1.

TABLE 1

Number of operations. The required numbers of operations to measure dark channels and minimum channels are shown in the row of $\tilde{t}$. The numbers of operations to compute fog-free images x and atmospheric light a are shown in the middle rows and the last row, respectively. The symbol > stands for comparison operation. The symbols −, + and / stand for subtraction, addition and division operations.

|   |   | DCP | | Wiener | |
|---|---|---|---|---|---|
|   |   | RGB | Bayer | RGB | Bayer |
| $\tilde{t}$ | > | $m(3n^2-1)$ | $m(n^2-1)$ | 2m | 3m |
| x | − | 3m | m | 3m | m |
|   | + | 3m | m | 3m | m |
|   | / | 3m | m | 3m | m |

In order to reduce the complexity of dealing with missing values, preferred embodiments sort by the brightest pixels of each channel based on the fact that all color values tend to be bright in hazy regions. Table 1 summarizes the required number of operations in Bayer images comparing against the number in RGB images.

Atmospheric light varies smoothly in local neighborhood regions and the pixel values are similar to each other in those regions. See, R. T. Tan, "Visibility in bad weather from a single image," in IEEE Conference on Computer Vision and Pattern Recognition, 2008, pp. 1-8. The present inventors have determined that this implies that a group of pixel values can be represented by a single value within the group. Another conclusion reached is that it is not necessary to preserve edges and details in estimating atmospheric light because we assume that atmospheric light is invariant in an entire image. Due to such considerations, atmospheric light can be approximately measured in downsampled versions of original images in both RGB images and Bayer images in order to significantly reduce the computational complexity of sorting. Computational cost can be reduced drastically as subsampled images shrink without loss on quality of de-hazed images. Note that Bayer images are subsampled at every 2i−1 pixels to retain three color values, where $i \in \mathbb{Z}$.

Additional Simulations: The kernel-based dark channel prior method (He et al) and pixel-based adaptive Wiener filter method (Gibson and Nguyen) were tested for comparing the quality of de-hazed images processed in a CFA pattern against that of RGB plane. In DCP method, a guided image filter (He, K., Sun. J. and Tang, X., "Guided Image Filtering," IEEE Trans. Pattern Anal. Mach. Intell., 35 pp. 1397-1409 (2012) was used to refine transmission instead of soft matting to reduce time complexity. The different sample kernel sizes were selected to be 15×15 and 32×32 pixels. The weighting coefficient γ was set to 0.95 and 0.9 for DCP and Wiener filter methods, according to the corresponding papers. RGB images were reconstructed from Bayer images using the gradient-corrected bilinear interpolated filter (Malvar, H. S., He, L. W., and Cutler, R.: "High-quality linear interpolation for de-mosaicing of Bayer-patterned color images", Proc. IEEE Int. Conf. Acoust., Speech, Signal Process. (ICASSP), 3, pp-485-8 (2004)), which is computationally efficient and fast. The performance of the FIG. 1B image processing pipeline of the invention was evaluated by using Naturalness Image Quality Evaluator (NIQE) (Mittal, A., Soundararajan, R. and Bovik, A. C.: "Making a 'Completely Blind' Image Quality Analyzer," IEEE Signal Process. Lett., 20, pp. 209-212 (2012)) and the blind contrast measurements (Hautière, N., Tarel, J. P., Aubert, D., and Dumont, E.: "Blind Contrast Enhancement Assessment by Gradient Ratioing at Visible Edgese," Image Analysis & Stereology Journal, 27, pp. 87-95 (2008). NIQE measures image quality based on natural scene statistics (NSS) without reference images. The metric e represents the restored visible edges that were invisible in hazy images. The value of $\bar{r}$ is the ratio of the gradients at visible edges before and after restoration.

The objective measured results from an outdoor image that included city and trees are tabulated in Table 2. The experimental results demonstrate that the present image pipeline can be used instead of the conventional pipeline with less computational complexity and minimal impact on image quality. The present method and pipeline reduces implementation complexity and de-mosaicing artifacts amplification while preserving image visual quality.

TABLE 2

Comparison of de-hazing algorithms performance on RGB images and CFA images. Evaluated using the NIQE and the blind contrast measurements (e, $\bar{r}$). The size of test images are specified below the image numbers.

|  |  | 1 (400 × 600) | | | 2 (1024 × 768) | | |
| --- | --- | --- | --- | --- | --- | --- | --- |
|  |  | NIQE | e | $\bar{r}$ | NIQE | e | $\bar{r}$ |
| DCP | RGB | 26.900 | 2.927 | 3.947 | 20.405 | 0.504 | 1.714 |
|  | CFA | 27.227 | 2.803 | 4.219 | 21.790 | 0.508 | 1.917 |
| Wiener filter | RGB | 23.671 | 2.698 | 3.557 | 21.065 | 0.501 | 2.288 |
|  | CFA | 22.898 | 2.443 | 3.744 | 21.572 | 0.465 | 2.437 |

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for processing image or video data performed in an image processing pipeline, the method comprising:
   receiving color filtered mosaiced raw image or video data,
      de-hazing the color filtered mosaiced raw image or video data to create de-hazed mosaiced image or video data and
   de-mosaicing the de-hazed mosaiced image or video data to create de-hazed and de-mosaiced image or video data, wherein the de-hazing comprises de-hazing a single data set of a single raw image,
   wherein the de-hazing comprises estimating atmospheric light in a subsampled version of the single raw image, and wherein said estimating applies a first assumption that atmospheric light varies smoothly in local neighborhood regions and the pixel values are similar to each other in the local neighborhood regions, and applies a second assumption that edges and details need not be preserved while estimating atmospheric light.

2. The method of claim 1, further comprising generating a full color image or video from the de-hazed and de-mosaiced image or video data.

3. The method of claim 1, wherein the de-hazing treats the color filtered mosaic data as piecewise constant and replaces missing pixels in the color filtered mosaic data with nearest neighbor pixels.

4. The method of claim 3, wherein the de-hazing comprises a kernel based de-hazing method.

5. The method of claim 3, wherein the de-hazing applies a dark channel prior method to create the de-hazed mosaiced image or video data.

6. The method of claim 5, comprising the dark channel prior method using one color channel and finding substitute values for other color channels.

7. The method of claim 3, wherein the de-hazing comprises a pixel based de-hazing method.

8. The method of claim 3, wherein the de-hazing comprises an adaptive Wiener filter de-hazing method.

9. The method of claim 8, wherein minimum channels in the color filtered mosaiced raw image or video data are measured using adjacent pixels for a local region of pixels.

10. The method of claim 1, wherein the color filtered mosaiced raw image or video data comprises Bayer image data.

11. A camera including an image sensor and a color filter and an image processing pipeline, the image processing pipeline being configured to perform de-hazing of color filtered mosaiced raw image or video data according to claim 1.

12. The method of claim 1, wherein the image processing pipeline comprises a pipeline implemented in a machine vision system.

13. The method of claim 1, wherein the de-hazing treats atmospheric light as invariant in an entirety of the single raw image.

14. The method of claim 1, wherein the de-hazing and de-mosaicing are conducted on the single data set of the single raw image and then conducted on single data sets of additional single raw images.

15. The method of claim 1, wherein the de-hazing comprises a patch-based de-hazing algorithm.

16. The method of claim 1, wherein each single raw image in a series of raw images is directly recovered via the de-hazing and the de-mosaicing.

17. A method for processing image or video data performed in an image processing pipeline, the method comprising:
   receiving color filtered mosaiced raw image or video data, de-hazing the color filtered mosaiced raw image or video data to create de-hazed mosaiced image or video data and de-mosaicing the de-hazed mosaiced image or video data to create de-hazed and de-mosaiced image or video data, wherein the de-hazing comprises de-hazing a single data set of a single raw image, and
   wherein the de-hazing comprises estimating haze in a local neighborhood region of the single raw image and de-hazing the entire single raw image from estimated haze in the local neighborhood region.

18. A camera including an image sensor and a color filter and an image processing pipeline, the image processing pipeline being configured to perform de-hazing of color filtered mosaiced raw image or video data according to claim 17.

19. The method of claim 17, wherein the image processing pipeline comprises a pipeline implemented in a machine vision system.

20. A method for processing image or video data performed in an image processing pipeline, the method comprising:
   receiving color filtered mosaiced raw image or video data, de-hazing the color filtered mosaiced raw image or video data to create de-hazed mosaiced image or video data and
   de-mosaicing the de-hazed mosaiced image or video data to create de-hazed and de-mosaiced image or video data, wherein the de-hazing comprises de-hazing a single data set of a single raw image,
   wherein the de-hazing treats the color filtered mosaic data as piecewise constant and replaces missing pixels in the color filtered mosaic data with nearest neighbor pixels, and
   wherein:
   the de-hazing defines a new color channel region as a 2×2 block (connected 4-pixel to upper left location) of the raw image so that each of a R, G and B color value can be measured in the raw image;
   measures dark channels $d_p^B$ the raw image within the same spatial region $\Omega_p^B$ of the raw image $$d_p^B = \min_{p \in \Omega_p^B} x_p^B$$

$$x_p^B = \sum_{c \in \{r,g,b\}} x_p^s(c)$$

where $x_p^S$ is the raw image sampled by the sensor according to a pattern of the color filter;
determines transmission $t_d^B$ in the raw image as $$t_d^B = 1 - \gamma \min_{p \in \Omega_p^B} \frac{y_p^B}{a^B}$$

where $y_p^B$ is divided by the corresponding atmospheric light color $a^B$ measured in pattern of the color filter; and
estimates the c-th color of atmospheric light individually estimated from either of the most haze-opaque regions using bright channels or dark channels.

21. A camera including an image sensor and a color filter and an image processing pipeline, the image processing pipeline being configured to perform de-hazing of color filtered mosaiced raw image or video data according to claim 20.

22. The method of claim 20, wherein the image processing pipeline comprises a pipeline implemented in a machine vision system.

* * * * *